United States Patent [19]

Davison, Jr. et al.

[11] Patent Number: 5,062,447
[45] Date of Patent: Nov. 5, 1991

[54] TRANSMISSION BREATHER CONTROL VALVE AND VENT

[75] Inventors: Ellard D. Davison, Jr., Grosse Pointe Farms; Lounes Rabhi, Ypsilanti, both of Mich.

[73] Assignee: General Motors Corporation, Detroit, Mich.

[21] Appl. No.: 678,406

[22] Filed: Apr. 1, 1991

[51] Int. Cl.$^5$ .............................................. F16K 15/00
[52] U.S. Cl. ........................................ 137/493; 33/727; 74/606 R
[58] Field of Search .................... 137/493, 493.8, 587; 33/727, 729; 74/606 R

[56] References Cited

U.S. PATENT DOCUMENTS

| 2,953,939 | 9/1960 | Rains | 74/606 |
| 3,314,306 | 4/1967 | Barclae | 74/606 |
| 3,686,973 | 8/1972 | Davison, Jr. et al. | 74/606 |
| 3,693,651 | 9/1972 | Gifford | 137/493 |
| 3,722,321 | 3/1973 | Walker et al. | 74/606 |
| 4,330,940 | 5/1982 | Leitgeb | 33/729 |

Primary Examiner—John C. Fox
Attorney, Agent, or Firm—Donald F. Scherer

[57] ABSTRACT

This invention relates to automatic transmissions and more particularly to valves for controlling and limiting automatic transmission breathing to reduce oxidation of the operating fluid fill. The valve permits relief of any residual pressure within the transmission housing for checking the operating fluid level.

1 Claim, 2 Drawing Sheets

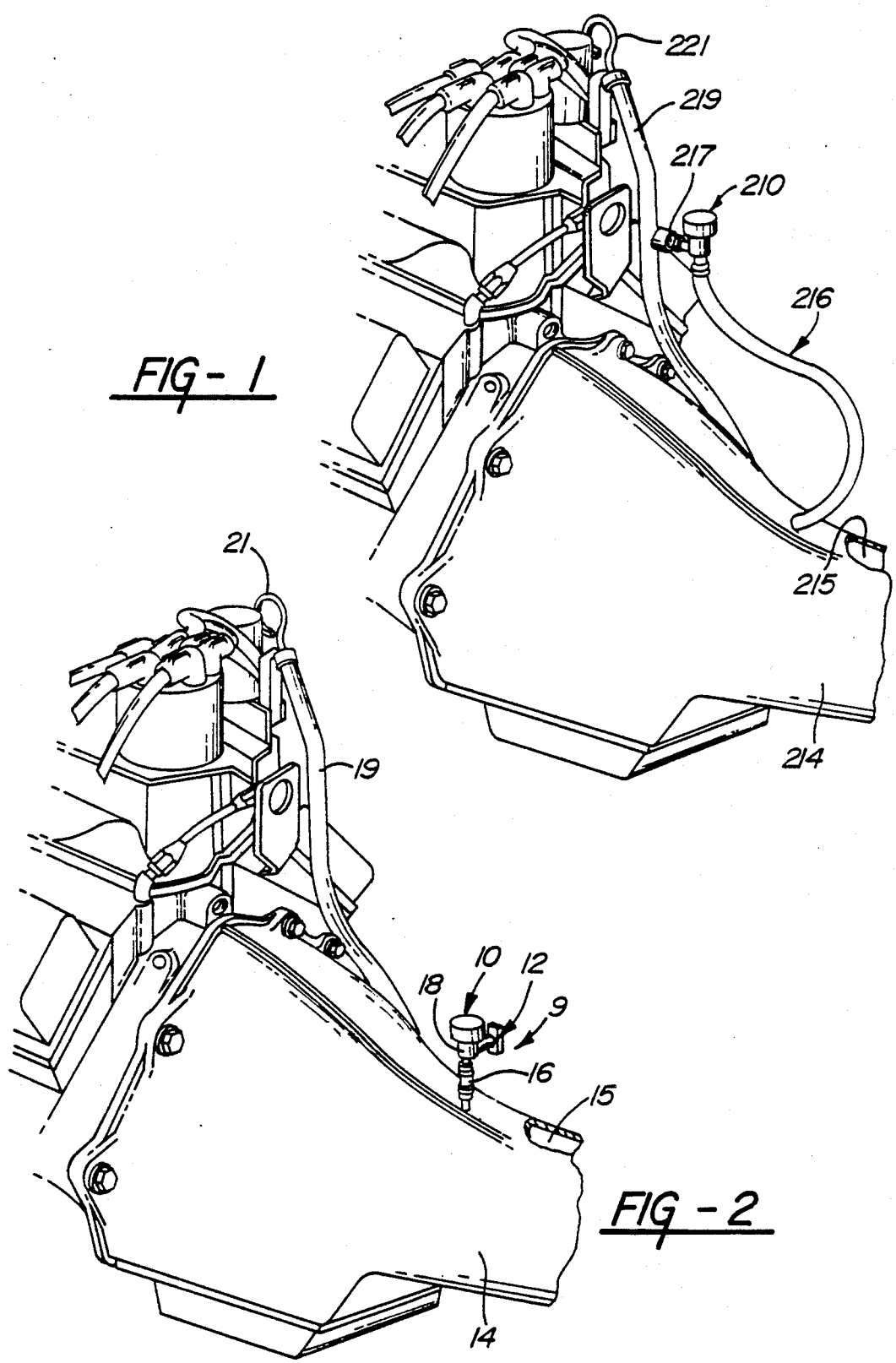

TRANSMISSION BREATHER CONTROL VALVE AND VENT

TECHNICAL FIELD

This invention relates to automatic transmissions and more particularly to valves for controlling and limiting automatic transmission breathing to reduce oxidation of the transmission operating fluid.

BACKGROUND OF THE INVENTION

In conventional automatic transmissions, air flows into and out of the transmission housing through a vent or a breather tube during transmission operation. The in and out flow of air can be characterized as transmission breathing. When temperatures in the transmission housing increase, the air and operating fluid in the transmission housing expand and air flows freely out of the vent into the atmosphere. Without a provision for breathing, pressure within the transmission housing would become sufficiently high to force transmission hydraulic operating fluid past the seals.

When the temperatures in the transmission housing decrease, as when a car with a hot transmission is driven through high water, air flows freely into the transmission housing through the vent. Without a provision for breathing, vacuum within the transmission housing would draw contaminants into the transmission through the transmission seals.

During transmission breathing, the air within the transmission housing readily mixes with the operating fluid and causes undesired operating fluid oxidation. The oxidation accelerates with increases in operating fluid temperatures and breathing rates. This requires the transmission operating fluid be changed periodically.

One method of minimizing the oxidation of the operating fluid is to restrict the breathing of the transmission. Such a breathing control system is described in U.S. Pat. No. 3,686,973 issued to Davison, Jr. et al. on Aug. 29, 1972 and assigned to the assignee of the present invention. The breathing control system is normally closed, preventing fresh air from entering the transmission under most operating conditions The device does provide vacuum relief when a predetermined level of vacuum within the transmission housing is reached.

Restricting the breathing of the transmission can make accurate measuring of the transmission operating fluid level difficult. The use of a breather control system which restricts the exchange of air with atmosphere results in residual pressure or vacuum developing within the transmission housing. Most automatic transmissions use an ullage rod, or dipstick, for measuring operating fluid levels. The dipstick is disposed in an operating fluid fill pipe which serves to limit the travel of the dipstick into the transmission. The fill pipe has its lower end inserted into the transmission housing. The lower end of the fill pipe is submerged beneath the operating fluid level in the transmission.

The residual pressure and vacuum make the operating fluid level indicator on the dipstick an unreliable indicator of transmission operating fluid level. A positive gas pressure in the transmission housing would push the operating fluid in the partially submerged fill pipe to a level higher than that in the transmission housing. Thus, the operating fluid level indicated by the dipstick would not be the same as that in the transmission housing. For example, with a gas pressure of 0.02 psig in the transmission housing, the operating fluid level inside the fill pipe will be about 0.7 inches higher than that in the transmission housing. (Height of operating fluid in fill pipe = gas pressure in transmission housing divided by the operating fluid density). With a negative pressure (a vacuum) retained in the transmission housing, the dipstick reading would be similarly lower than that in the transmission housing. When the level of operating fluid indicated on the dipstick does not correspond to the actual level within the cavity, the level of operating fluid within the cavity cannot be determined with the dipstick.

Transmissions with both the bottom end of the fill pipe below the operating fluid level in the transmission housing cavity and a breather control restricting the passage of gas between the interior of the transmission housing and atmosphere require relief of pressure and vacuum to the atmosphere in order to obtain an accurate dipstick reading of the operating fluid level in the transmission housing.

SUMMARY OF THE INVENTION

A manual valve integral with the breathing control system is one provision for relieving residual gas pressure and vacuum within the transmission housing. The manual valve is closed to control transmission breathing and open for checking of transmission operating fluid level. The manual valve opens the transmission housing to the atmosphere. The pressures inside the housing and inside the fill pipe are thereby equalized resulting in the operating fluid level in the fill pipe equaling that in the transmission housing.

With the manual valve configuration, the top end of the fill pipe does not have to be sealed to prevent air from freely entering the transmission housing. However, sealing the top of the fill pipe is desirable to prevent air from entering the fill pipe and oxidizing the operating fluid in the pipe.

An alternate provision to relieve residual pressure and vacuum within the transmission housing is to link the breather control system to both the transmission vent opening and to an opening in the upper portion of the transmission fill pipe. With this provision the dipstick must seal against the fill pipe when the dipstick is fully inserted to prevent the air from freely passing through the connecting tube to the transmission housing. The breather control system is in fluid communication with both the fill pipe and the transmission housing cavity such that pulling out the dipstick and breaking the seal equalizes the pressure within the fill pipe, the transmission housing cavity, and the valve housing cavity to atmospheric pressure.

Either provision for relieving residual gas pressure and vacuum will provide the benefit of reducing oxidation of the transmission operating fluid and increasing the mileage between fluid changes while additionally permitting accurate measurements of the level of operating fluid with the dipstick.

It is an object of this invention to provide a breather control system for an automatic transmission comprising a sealed transmission housing, a primary valve assembly including a pressure check valve means, a vacuum check valve means, a manual pressure bleed valve means, and a common cavity with which the three valve means are in fluid communication, and means for connecting the primary valve assembly to the transmission housing such that they are in fluid communication with one another.

It is another object of this invention to provide a breather control system for an automatic transmission comprising a sealed transmission housing, a primary valve assembly including a pressure check valve means, a vacuum check valve means, and a common cavity with which the two check valve means are in fluid communication, and means for connecting the primary valve assembly to the transmission housing and to the fill pipe such that all three are in mutual fluid communication.

It is still another object of this invention to provide an improvement in breather control systems for an automatic transmission including a sealed transmission housing, a primary valve assembly located above a level of operating fluid in the transmission housing with a pressure check valve means, a vacuum valve means, a common cavity connecting the vacuum check valve and the pressure check valve, and a connector providing fluid communication between a transmission housing cavity and the common cavity of the valve assembly, the improvement comprising a manual pressure bleed valve in fluid communication with the common cavity which can be manipulated to open the common cavity to atmosphere.

These and other objects and advantages will be more apparent from the following description and drawings.

DESCRIPTION OF THE DRAWINGS

FIG. 1 shows a perspective view of a breather control system with a primary valve assembly connected to both the transmission housing and the transmission fill pipe.

FIG. 2 shows a perspective view of a breather control system employing a manual pressure bleed valve with a primary valve assembly connected to the transmission housing.

DESCRIPTION OF THE PREFERRED EMBODIMENT

Figure 3:
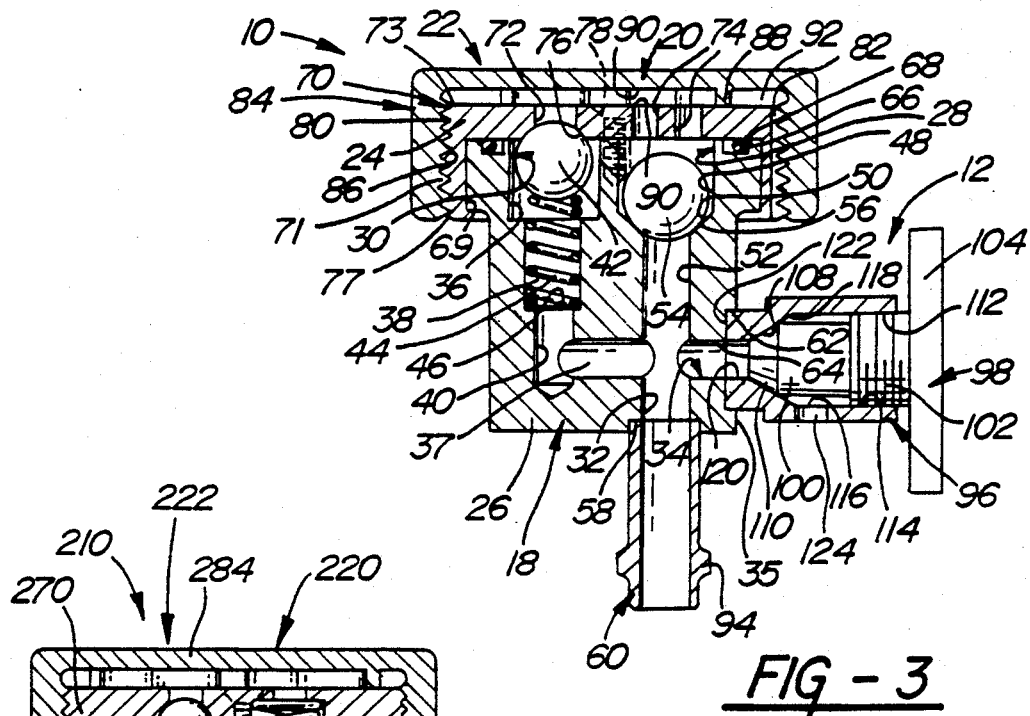
FIG. 3 shows a sectional view of a primary valve assembly with a manual pressure bleed valve means and a spring loaded ball vacuum check valve and a light weight ball pressure check valve.

FIG. 2 shows an installation orientation for a breather control system 9 having a primary valve assembly 10 with an integral manual pressure bleed valve 12. The valve assembly 10 is connected with a transmission housing 14 through a connecting tube 16 so as to be in fluid communication with a transmission housing cavity 15 interior to the transmission housing 14. The connecting tube 15 connects to the transmission housing 14 at a point above a level of operating fluid in the transmission cavity 15. A transmission operating fluid fill pipe 19 is mounted such that its lower end (not shown) is inserted into the transmission housing. The transmission employs a hydraulic operating fluid (not shown). Atmospheric gases are found in the transmission housing cavity 15 above the transmission operating fluid. An ullage rod, or dipstick 21, is disposed within the fill pipe 19 to measure the level of operating fluid within the transmission housing cavity 15. The level of operating fluid within the transmission housing 14 is higher when the transmission is in a non-operating mode than when the transmission is in an operating mode.

FIG. 3 shows a valve assembly 10, like that shown in FIG. 2 with the manual pressure bleed valve 12, in more detail than FIG. 2. The valve assembly 10 of FIG. 3 is of a dual ball, single spring configuration.

The central component of the valve assembly 10 is a valve housing 18. The valve housing 18 accommodates pressure and vacuum check valves 20 and 22. The valve housing 18 also makes provisions for the manual pressure bleed valve 12.

The valve housing 18 has a top end 24 and an opposing bottom end 26. The valve housing 18 has four orifices 28, 30, 32, and 34. The first orifice 28 accommodates the pressure check valve 20. The second orifice 30 accommodates the vacuum valve 22. Both orifices 28 and 30 pass through the top end 24. The third orifice 32 connects the valve housing 18 to the transmission housing cavity 15. This orifice 32 is on the bottom end 26 of the valve housing 18. The fourth orifice 34 is in a side 35 of the valve housing 18 and accommodates the manual pressure bleed valve 12. The orifices 28, 30, 32, and 34 are all in fluid communication with one another forming a primary valve cavity 37. The orifices 28 and 30 which accommodate the pressure and vacuum valves 20 and 22 are parallel with one another.

The vacuum check valve orifice 30 has three different diametrical stages 36, 38, and 40. The first stage 36 is large enough to freely accommodate a vacuum check valve ball 42 and passes through the top end 24. The second stage 38 is smaller than both the first stage 36 and the vacuum check valve ball 42. The second stage 38 is large enough to accommodate a coil spring 44. The third stage 40 is smaller than the second stage 38. The transition between the second stage 38 and the third stage 40 forms an annular shelf 46 on which the coil spring 44 rests. The third stage 40 stops short of the bottom end 26 of the valve housing 18. The vacuum check valve 22 employs the spring 44 located in the second stage diameter to seat the vacuum check valve ball 42. The ball 42 rests on top of the spring 44 and remains in the first stage 36 of the vacuum check valve 22. A constant diameter groove 66 to accommodate an O-ring 68 circumscribes the two valve orifices 28 and 30 in the top end of the valve housing 18. The O-ring 68 is located in that groove 66.

The pressure check valve orifice 28 has three diametrical stages 48, 50 and 52. The first stage 48 is sufficiently large to accommodate a pressure check valve ball 54. The second stage 50 tapers from the first stage 48 to a smaller diameter third stage 52. The second stage 50 forms a seat 56 for the pressure check valve ball 54. The pressure check valve ball 54 is seated by gravity in the tapered seat 56 of the second stage 50 of the pressure check valve orifice 28. It is of light weight to minimize the residual pressure within the transmission housing 14.

The third stage 52 passes through the bottom end 26 of the valve assembly housing 18, providing the third orifice 32, used as a path of fluid communication out of the valve housing 18, to the transmission housing 14. There is a shallow annulus 58 in the bottom end 26 of the valve housing 18. The annulus 58 is concentric with the orifice 32 passing through the bottom end 26. The annulus 58 locates a connector 60 which accommodates the connecting tube 16.

The fourth orifice 34 accommodates mounting the manual pressure bleed valve 12 and connects the third stage 52 of the pressure check valve orifice 28 with the third stage 40 of the vacuum check valve orifice 30. The manual pressure bleed valve orifice 34 has two diametrical stages 62 and 64. The larger diameter first stage 62 is a shallow annulus. The first stage 62 accommodates the mounting of the manual pressure bleed valve 12. The second stage 64 is approximately the same diameter as the third stages 40 and 52 of the pressure and vacuum check valve orifices. The fourth orifice 34 provides fluid communication between the bleeder valve 12, the vacuum check valve 22, and the pressure check valve 20.

A restrictor 70 is placed over the top end 24 of the valve housing 18. The restrictor 70 is cup shaped, complimenting the shape of the valve housing 18. The restrictor 70 has openings 72 and 74 aligned with both the vacuum check valve orifice 30 and the pressure check valve orifice 28 of the valve assembly housing 18. The vacuum check valve opening 72 in the restrictor 70 is smaller than the vacuum check valve hall 42. The vacuum check valve opening 72 is chamfered to provide a seat 76 for the vacuum check valve ball 42.

The pressure check valve opening 74 has material disposed over the center of the pressure check valve orifice 28 to prevent the pressure check valve ball 54 from seating and sealing against the restrictor 70 when the pressure check ball 54 is displaced upward.

The restrictor 70 is positioned relative to and attached to the valve housing 18 by two screws 78 which pass through the restrictor 70 and thread into the valve housing. When assembled, the restrictor 70 compresses the O-ring 68 in the constant diameter groove 66, sealing the restrictor 70 relative to the valve housing 18. The restrictor 70 also compresses the spring 44 supporting the vacuum check valve ball 42.

The restrictor 70 has threads 80 in the outside diameter 71. There is a plurality of slits 82 in the outside diameter 71 of the restrictor 70 running from the outer surface 73 to the bottom edge 77.

A cap 84 has threads on an inside diameter 86 corresponding to the threads 80 on the outside diameter 71 of the restrictor 70. The cap 84 threads onto the restrictor 70. The cap 84 has a plurality of protrusions 88 on an inner surface 90 facing the restrictor 70 which limit the travel of the cap 84 when threading the cap 84 to the restrictor 70. The protrusions 88 provide a gap 92 between the restrictor 70 and the cap 84 when the cap 84 is tightened against the restrictor 70. The slits 82 in the outside diameter 71 of the restrictor 70 and the gap 92 between the restrictor 70 and the cap 84 together provide fluid communication between the valve openings 72 and 74 in the restrictor 70 and the outside atmosphere.

The connector 60 is fixed to the valve housing 18 at the annulus 58 in the bottom end 26. The connector 60 is of constant diameter except for an expanded diameter section 94 which aids in retention of the connecting tube 16.

The manual pressure bleed valve 12 has a valve body 96 and a valve needle 98. The valve needle 98 has three portions: a tip portion 100, a threaded portion 102, and a handle portion 104. The threaded portion 102 allows the valve needle 98 to engage and disengage from a valve seat 108 in the valve body 96. The tip portion 100 is smaller in diameter than the root diameter (not shown) of the threaded portion 102. The tip portion 100 has a tapered end 110 suitable for engaging the valve seat 108. The handle portion 104 is rotatively fixed to the threaded portion 102 at an end of the valve needle 98 opposite the tapered end 110 of the tip portion 100.

The valve body 96 of the manual pressure bleed valve 12 has four diametrical stages. The first stage 112 has threads at an outboard end 114 of the valve body 96 compatible with the threaded portion 102 of the valve needle 98. The second stage 116 is diametrically larger than the tip portion 100 of the needle 98. The third stage 118 is tapered from the second stage diameter 116 down to a smaller fourth stage diameter 120. The fourth stage 120 passes through an inside end of the valve body. An exhaust orifice 124 is located in a side of the valve body 96 passing from the outside to the second stage 116.

Figure 4:
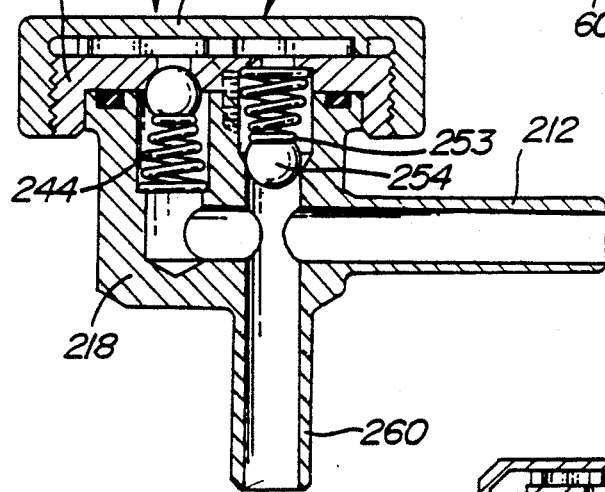
FIG. 4 shows a sectional view of a primary valve assembly with both a spring loaded ball vacuum check valve and a spring loaded ball pressure check valve.

FIG. 1 shows an installation orientation for a valve assembly 210 like that shown in FIG. 4 with a side connector 212 in place of the manual pressure bleed valve 12 of FIG. 2 and FIG. 3. The transmission employs a hydraulic operating fluid (not shown). Atmospheric gases are present in the transmission housing cavity 215 above the transmission operating fluid. A connecting tube 216 connects a bottom connector 260 of the valve assembly 210 to the transmission housing 214 at a point on the transmission housing 214 above the maximum expected level of operating fluid within the transmission housing 214, providing fluid communication between a transmission housing cavity 215 and the valve assembly 210. A side connector 212 of the valve assembly 210 is connected to a connecting element 217 fixed to a transmission fill pipe 219. The transmission fill pipe 219 is inserted into the transmission housing 214.

The side connector 212 and the connecting element 217, when combined, provide fluid communication between the valve assembly 210 and the transmission fill pipe 219. The connecting element 217 is located at a point on the transmission fill pipe 219 above the level of the operating fluid in the transmission fill pipe 219 for both the transmission operating an non-operating modes. An ullage rod, or dipstick 221 is disposed within the fill pipe 219 to measure a level of operating fluid within the transmission housing cavity 215. The dipstick 221 seals against the fill pipe 219. This provides the fill pipe with a sealed closure. Typically, the level of operating fluid within the transmission housing cavity 215 is higher when the transmission is in a non-operating mode than when the transmission is in a operating mode.

The valve assembly 210 is identical in most other respects to the valve assembly 10 of FIG. 3 except that there is a coil spring 253 used with a pressure check ball 254 to increase the amount of residual pressure that accumulates within the transmission housing 214 before the pressure check valve ball 254 is displaced. The pressure check valve spring 253 and a vacuum check valve spring 244 are tapered instead of being a constant diameter as was the vacuum check valve spring 44 in FIG. 3. The side connector 212 and the bottom connector 260 are formed integral with the valve housing 218. The restrictor 270 is attached to the valve housing 218 in the same manner that the restrictor 70 and the valve housing 18 of FIG. 3 are attached. A cap 284 attaches to the restrictor 270 in the same manner as the cap 84 and restrictor 70 of the valve assembly 10 of FIG. 3.

Figure 5:
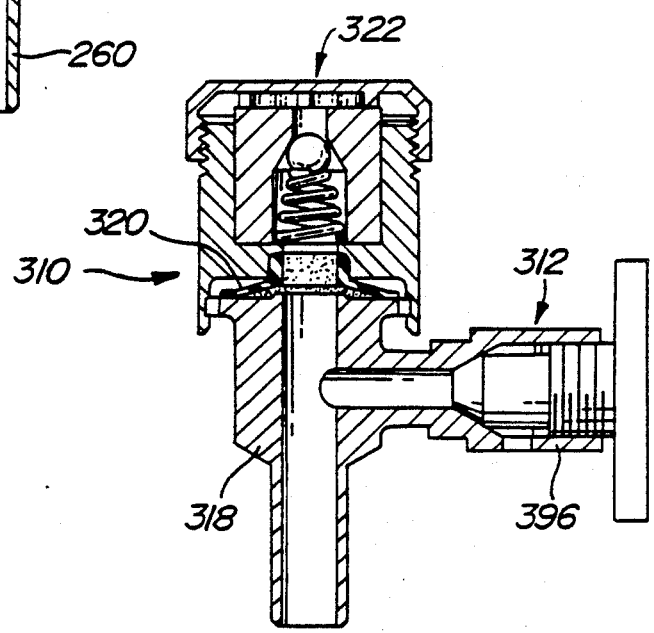
FIG. 5 shows a sectional view of a primary valve assembly with a manual pressure bleed valve and a spring loaded ball vacuum check valve and a diaphragm spring pressure check valve.

A third variation of a valve assembly 310 is shown in FIG. 5, where a manual pressure bleed valve 312 has a valve body 396 integral with a valve housing 318 and the pressure check valve 320 is a diaphragm valve. The pressure check valve 320 and the vacuum check valve 322 here are in series instead of in parallel as in the valve assemblies 20 and 22 of FIG. 3 and 220 and 222 of FIG. 4.

The advantages of this invention are more apparent when the system is seen operating. Under operating conditions, the temperature within the transmission housing 14, 214 rises above the ambient atmospheric temperature. Because the interior of the transmission housing 14, 214 is sealed from the atmosphere, the temperature increase results in the pressure inside of the transmission housing increasing. The valve assembly 10, 210, 310 relieves the pressure at a selected pressure level. The light weight pressure check valve ball 54 of the FIG. 3 pressure valve configuration would be appropriate for maintaining a very low level of pressure within the transmission housing 14, 214 relative to the atmosphere. Higher levels of pressure could be maintained by the configurations shown in FIG. 4 with a spring loaded ball or with a diaphragm spring check valve 320 shown in FIG. 5. It is desirable to have the selected pressure level of the pressure relief provided by the valve 10, 210, 310 be below the pressure level at which various seals (not shown) of the transmission housing, particularly those around rotating parts which protrude through the transmission housing 14, 214, will deflect. Typically, if these seals deflect, there will be a loss of transmission hydraulic operating fluid.

A number of conditions can also cause the temperature within the transmission housing 14, 214 to decrease after having been elevated in temperature. One is the gradual decrease in temperature that occurs when the vehicle is parked. Another is splashing the transmission housing 14, 214 with water, as when the vehicle runs through standing water, thereby decreasing the temperature of the transmission housing 14, 214 and the temperature of the fluids within the transmission housing 14, 214. This decrease in temperature will produce a vacuum within the transmission housing 14, 214 relative to the atmosphere if the transmission housing 14, 214 is sealed relative to the atmosphere. The vacuum is relieved at a selected vacuum level by the valve assembly 10, 210, 310. FIG. 3, FIG. 4, and FIG. 5 all illustrate a spring loaded vacuum check ball configuration, although other configurations could be employed. It is desirable to select a vacuum relief point which is below (in terms of absolute pressure) the vacuum level at which transmission seals (not shown) would deflect inward, permitting the passage of air into the transmission housing 14, 214. This is undesirable because of the potential for contaminants to be drawn in with the air in the area of rotating elements.

The objective in selecting pressure and vacuum relief values for the valve assemblies 10, 210, 310 is to provide levels that will minimize the number of air exchanges with the atmosphere to maximize the life of the transmission operating fluid while avoiding operating fluid loss through the seals under pressure and transmission component contamination under vacuum.

The use of a valve assembly 10, 210, 310 which produces a residual vacuum or pressure within a transmission housing 14, 214 makes transmission operating fluid measurement with the dipstick 21, 221 difficult. The end of the fill pipe 19, 219 is submerged in transmission operating fluid below the operating level of the operating fluid. When there is a residual vacuum in the transmission housing case 14, 214, the readings on the dipstick 21, 221 would incorrectly indicate that the level of operating fluid in the transmission housing 14, 214 is too low because the vacuum in the transmission housing 14, 214 would lower the level of operating fluid in the fill pipe 19, 219. Conversely, when there is residual pressure within the transmission housing 14, 214, the level of operating fluid in the transmission housing 14, 214 is too high because the pressure in the transmission housing 14, 214 would raise the level in the fill pipe 19, 219 as well.

The two alternate configurations, one with a manual pressure bleed valve, as shown in FIG. 2, FIG. 3, and FIG. 5, and one with connections to the transmission housing cavity 215 and fill pipe 219 as shown in FIG. 1 and FIG. 4, both bring the operating fluid level in the fill pipe 19, 219 into equilibrium with the operating fluid level in the transmission housing 14, 214, allowing an accurate measurement of transmission operating fluid level to be made. The fill pipe 219 to transmission housing 214 interconnection shown in FIG. 1 equalizes the fill pipe operating fluid level with the transmission housing operating fluid level by releasing any pressure or vacuum as soon as the dipstick 221 is unseated from the fill pipe 219, opening the entire system to atmosphere. The manual pressure bleed valve 12 shown in FIG. 2 and FIG. 3, and 312 in FIG. 5 equalizes the fill pipe operating fluid level with the transmission housing operating fluid level by opening up the transmission housing cavity to atmosphere when the valve 12, 312 is manually opened. The fill pipe operating fluid level and the transmission housing operating fluid level must be equalized before taking a dipstick reading.

Obviously, many modifications and variations of the present invention are possible in view of the above teaching. It is therefore to be understood, that within the scope of the appended claims, the invention may be practiced otherwise than as specifically described.

The embodiments of the invention in which an exclusive property or privilege is claimed are defined as follows:

1. A breather control system for an automatic transmission in an engine driven vehicle comprising:
    a transmission housing sealed to prevent fluid communication between a cavity within the transmission housing and atmosphere except through a primary valve assembly;
    a transmission fill pipe having a sealed closure and inserted into the transmission housing;
    the primary valve assembly, being disposed above a level of operating fluid in the transmission housing for both the transmission operating and non-operating modes, restricting passage of gas into and out of the transmission housing, further comprising:
        pressure check valve means for relieving gas pressure within the transmission housing cavity by venting the transmission housing cavity to atmosphere when a selected pressure differential between the transmission housing cavity and atmosphere is exceeded;
        vacuum check valve means for relieving vacuum within the transmission housing cavity by venting the transmission housing cavity to atmosphere when a selected vacuum differential between the transmission housing cavity and atmosphere is exceeded; and
        a common cavity with which the two valve means and the transmission housing are in fluid communication;
    means for connecting the primary valve assembly to the transmission housing, providing fluid communication between the primary valve assembly and transmission housing cavity, connecting to the transmission housing at a point above the level of the operating fluid in the transmission housing for both the transmission operating and non-operating modes; and means for connecting the primary valve assembly to the transmission fill pipe, providing fluid communication between the common cavity of the primary valve assembly and transmission fill pipe, connecting to the transmission fill pipe at a point above the level of the operating fluid in the transmission fill pipe for both the transmission operating and non-operating modes.

* * * * *